United States Patent
Fujimoto et al.

(10) Patent No.: US 7,484,227 B2
(45) Date of Patent: Jan. 27, 2009

(54) PROTECTION OF OPERATION OF DISC DRIVE AGAINST THE APPLICATION OF EXTERNAL OSCILLATION

(75) Inventors: Fumihiko Fujimoto, Hyogo (JP); Tomohisa Koseki, Hyogo (JP); Minoru Horiyama, Hyogo (JP)

(73) Assignee: Fujitsu Ten Limited, Kobe-Shi (JP)

( * ) Notice: Subject to any disclaimer, the term of this patent is extended or adjusted under 35 U.S.C. 154(b) by 368 days.

(21) Appl. No.: 11/337,039

(22) Filed: Jan. 20, 2006

(65) Prior Publication Data

US 2006/0164933 A1   Jul. 27, 2006

(30) Foreign Application Priority Data

Jan. 21, 2005   (JP)   ............... 2005-014087

(51) Int. Cl.
   *G11B 17/04*   (2006.01)
(52) U.S. Cl. .................................... 720/619
(58) Field of Classification Search .... 369/30.75–30.79
   See application file for complete search history.

(56) References Cited

U.S. PATENT DOCUMENTS

| | | | |
|---|---|---|---|
| 5,532,986 A * | 7/1996 | Sakiyama | 369/30.78 |
| 5,862,113 A * | 1/1999 | Tsuyuguchi et al. | 369/53.18 |
| 5,864,522 A * | 1/1999 | Sugano et al. | 369/30.29 |
| 5,886,966 A * | 3/1999 | Ota et al. | 369/53.18 |
| 5,970,042 A * | 10/1999 | Fujimoto et al. | 369/30.78 |
| 6,370,105 B1 * | 4/2002 | Fujimoto | 369/30.78 |
| 6,373,801 B2 * | 4/2002 | Ichikawa | 369/53.18 |
| 6,466,524 B1 * | 10/2002 | Fujimoto | 369/30.85 |
| 6,633,517 B1 * | 10/2003 | Nakamichi | 369/30.78 |
| 6,832,382 B2 * | 12/2004 | Ito et al. | 720/619 |
| 7,095,690 B2 * | 8/2006 | Ikeda et al. | 369/47.52 |
| 7,236,437 B2 * | 6/2007 | Hsu et al. | 369/53.18 |
| 7,324,414 B2 * | 1/2008 | Tsuchiya et al. | 369/44.32 |
| 7,339,858 B2 * | 3/2008 | Tatekawa | 369/30.85 |
| 2006/0168603 A1 * | 7/2006 | Goto | 720/619 |

* cited by examiner

*Primary Examiner*—Allen T Cao
(74) *Attorney, Agent, or Firm*—Fogg & Powers LLC

(57) ABSTRACT

A disc changer has a protector which protects the operation of the disc changer even when an oscillation is applied to the disc changer, without adding a new oscillation sensor to the disc changer. In the disc changer that takes out a desired disc from a stocker with a swing arm and returns the reproduced disc to the stocker, an oscillation sensor monitors an output of a position sensor which detects a position of a member that rises and falls within the disc changer. Based on a variation in the output of the position sensor, the oscillation sensor detects a size of the oscillation applied to the disc changer. When the oscillation is larger than a predetermined value, the swing arm operation of clamping a disc and returning a disc to the stocker is temporarily stopped or is restarted, thereby protecting the disc changer from the oscillation.

20 Claims, 6 Drawing Sheets

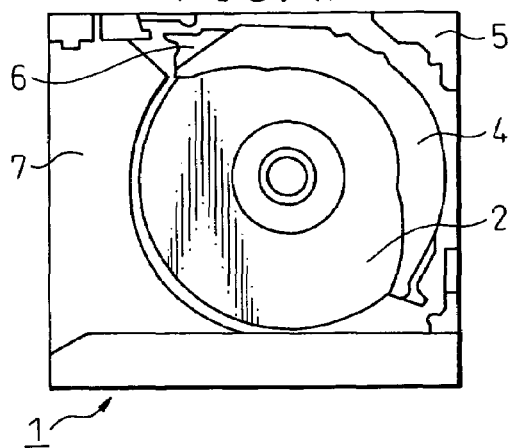
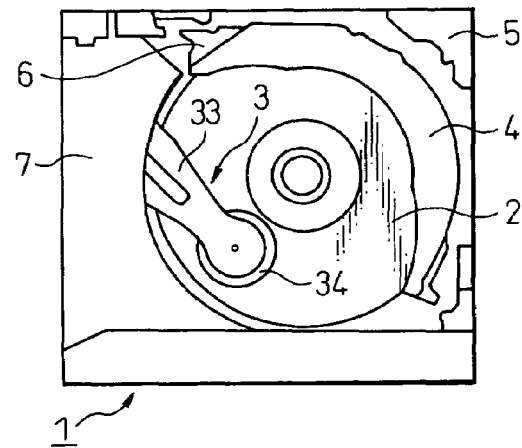
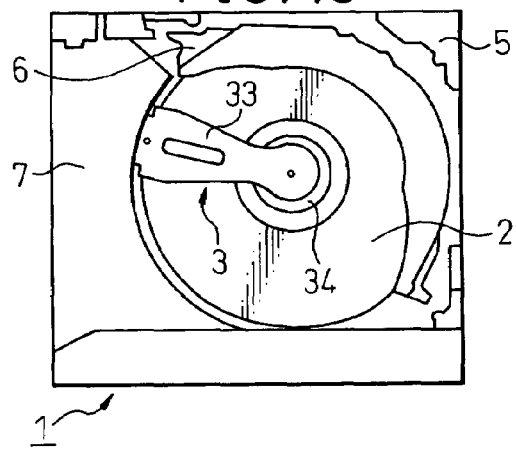
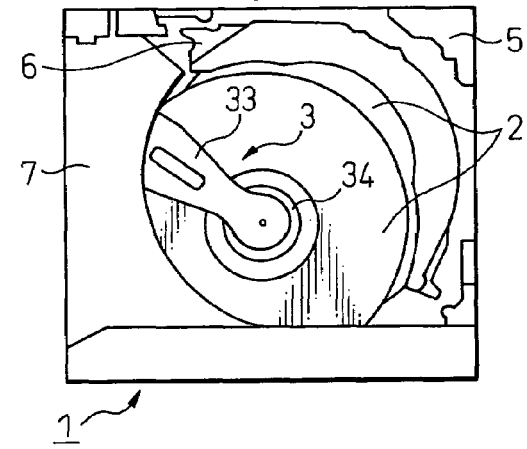
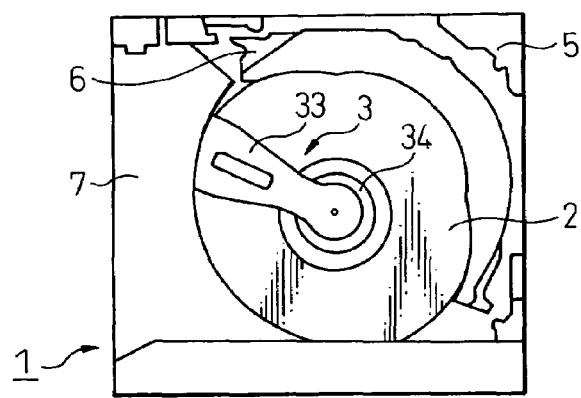

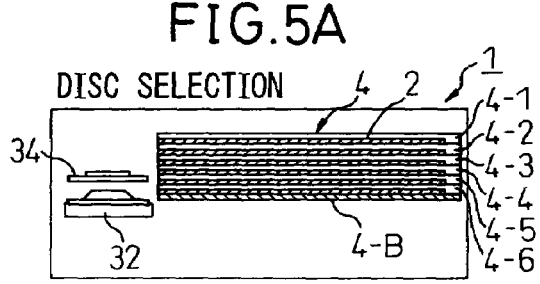
FIG.5A DISC SELECTION
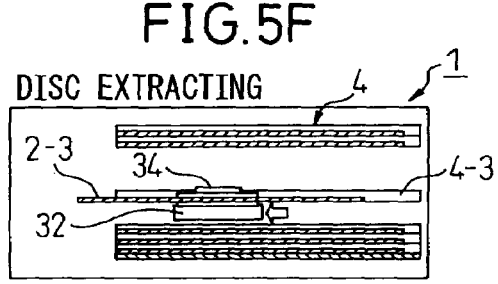
FIG.5F DISC EXTRACTING
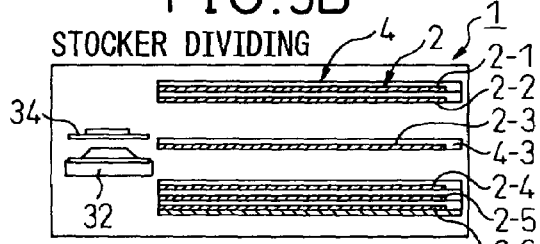
FIG.5B STOCKER DIVIDING
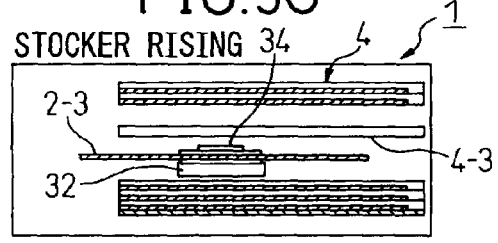
FIG.5G STOCKER RISING
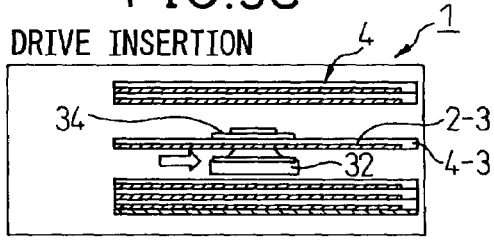
FIG.5C DRIVE INSERTION
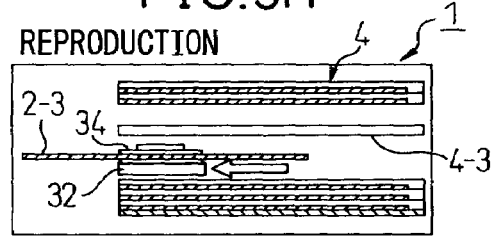
FIG.5H REPRODUCTION
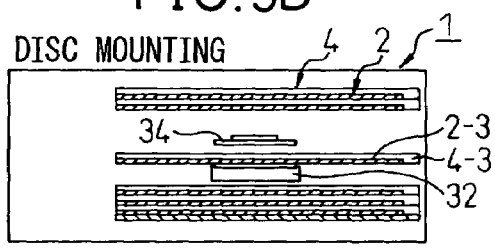
FIG.5D DISC MOUNTING
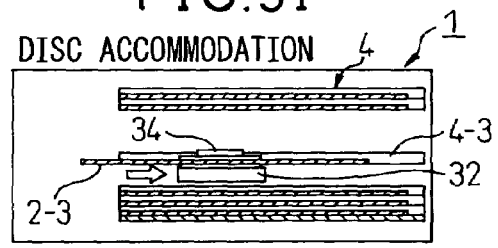
FIG.5I DISC ACCOMMODATION
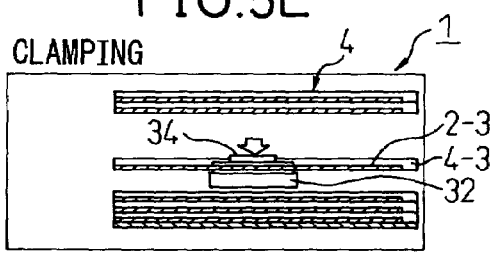
FIG.5E CLAMPING
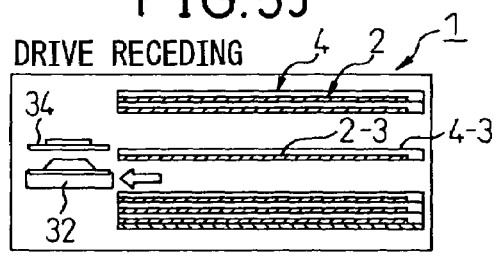
FIG.5J DRIVE RECEDING

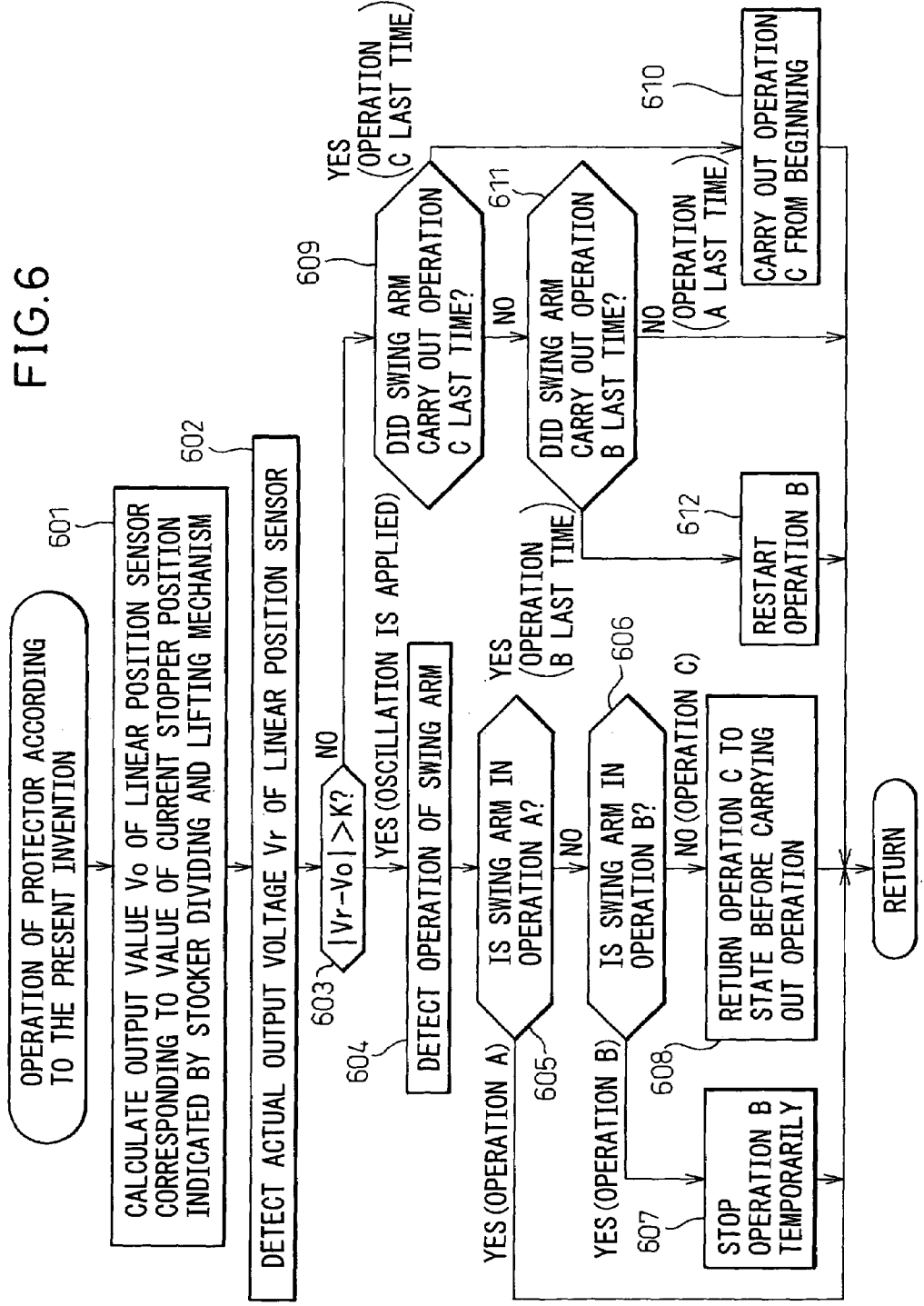

PROTECTION OF OPERATION OF DISC DRIVE AGAINST THE APPLICATION OF EXTERNAL OSCILLATION

CROSS-REFERENCE TO RELATED APPLICATION

This application claims priority from, an incorporates by reference the entire disclosure of, Japanese Patent Application No. 2005-14087, filed on Jan. 21, 2005.

BACKGROUND OF THE INVENTION

1. Field of the Invention

The present invention relates to a disc changer. Particularly, the invention relates to a disc changer incorporated in a disc drive unit, the disc changer having a protector that prevents a failure, in moving a disc, attributable to a displacement of a mechanical part of the disc drive unit when an external oscillation is applied to the mechanical part at the time of moving the disc.

2. Description of the Related Art

Conventionally, a cassette tape has been the mainstream medium recorded with music to provide music in a motor vehicle. However, a disc medium (hereinafter simply referred to as a disc) such as a compact disc (CD) and a mini disc (MD) is now mainly used in place of the cassette tape. Because the disc is thinner than the cassette tape, and particularly because an optical disc is not in a case, the accommodation space can be small. Therefore, a disc changer that accommodates plural discs in a reproducing unit and reproduces the recorded content by changing the discs is popular. A disc changer is also being developed for a digital versatile disc (DVD) type of optical disc.

This disc changer of optical discs has a disc accommodation rack capable of separately accommodating plural discs, one by one, inside a casing. A swing arm takes out a desired one of the discs from this disc accommodation rack, and reproduces the content of the disc using an optical head. When the reproduction ends, the swing arm returns the disc to the disc accommodation rack. In general, a turntable on which a disc is rotated and a clamper that fixes the disc onto the turntable are provided at the front end of the swing arm. An optical head moves in a radial direction of the optical disk, on a moving path formed on the swing arm, on the disc that rotates on the turntable, thereby reproducing the information recorded on the disc. Generally, the disc changer has the disc accommodation rack movably arranged, in the up and down directions, to facilitate the taking out of a desired one disc from the disc accommodation rack.

An early CD disc changer was large in size, and was accommodated in a trunk of a motor vehicle. However, due to an increasingly compact size of the disc changer in recent years, the disc drive unit that incorporates the disc changer can be accommodated in a center console of an instrument panel of the motor vehicle.

However, as a result of the small disc changer in the disc drive unit, the disc changer has a risk of suffering an operating failure. This is because, in the miniaturized disc changer, parts within the disc changer have smaller margins in size. Therefore, when an external oscillation is applied to the disc drive unit during the change of discs or during the taking in and out of a disc into and from the disc accommodation rack within the disc drive unit, the disc comes into contact with parts of the disc changer, or an operation failure occurs, at the swing arm, in clamping a disc onto the turntable.

In order to prevent the malfunction of the disc changer due to the application of an oscillation, it is considered suitable to arrange that an oscillation sensor such as an acceleration sensor detects a size of the oscillation applied to the disc drive unit and, when an oscillation is detected, the disc drive unit stops the operation of changing discs or clamping a disc. However, the addition of the oscillation sensor to the disc drive unit results in an increase in the cost of the disc drive unit.

SUMMARY OF THE INVENTION

It is an object of the present invention to provide a disc changer having a protector that solves the conventional problems attributable to an oscillation applied to a disc drive unit incorporating a disc changer, and that protects the operation of the disc changer when an oscillation is applied to the disc drive unit, without additionally providing an oscillation sensor in the disc drive unit.

In order to achieve the above object, disc changers according to the following five aspects of the invention are possible.

According to a first aspect of the invention, there is provided a disc changer including: a disc accommodation rack that accommodates plural discs and can be lifted up and moved down within the disc changer; a swing arm that takes out a disc from the disc accommodation rack, and reproduces content recorded on the disc; a drive unit of the swing arm; a position sensor that detects a position of a member which rises and falls within the disc changer; a lifting mechanism that lifts up and moves down the disc accommodation rack; an oscillation detector which monitors an output of the position sensor, and detects an oscillation applied to the disc changer due to a variation in the output; a swing arm operation state detector which detects an operation state of the swing arm; and a temporary stopper that temporarily stops the move operation of the swing arm when the swing arm operation state detector detects a predetermined state of the swing arm and the oscillation is detected by the oscillation detector. The disc changer can further includes a restarter that cancels the temporary stop operation of the swing arm carried out by the temporary stopper when the oscillation detected by the oscillation detector becomes lower than a predetermined value. The position sensor can be a linear position sensor that detects a position of the disc accommodation rack, and the lifting mechanism can lift up and move down the disc accommodation rack based on the output of the linear position sensor.

According to a second aspect of the invention, there is provided the disc changer of the first aspect, wherein the disc changer further includes: a stopper that stops the move operation of the swing arm and returns the swing arm to a position before the move when the swing arm operation state detector detects another predetermined operation state of the swing arm due to the application of an oscillation; and a swing arm operation redoing unit that redoes the swing arm operation from the beginning when the oscillation detected by the oscillation detector becomes lower than a predetermined value.

According to a third aspect of the invention, there is provided the disc changer according to the first or the second aspect, wherein the predetermined operation state of the swing arm is any one of an operation state immediately before a disc is mounted on the turntable, an operation state when a disc is clamped to the turntable, and a state immediately before the swing arm starts operation.

According to a fourth aspect of the invention, there is provided the disc changer according to any one of the first to the third aspects, wherein the another predetermined operation state of the swing arm is either one of a state that the swing arm is inserted into an upper space and a lower space of a disc to sandwich the disc and a state that the swing arm returns a disc to a stocker.

According to a fifth aspect of the invention, there is provided a disc changer having an oscillation restricting operation function for restricting a predetermined operation based on a result of detecting an oscillation by an oscillation detector, wherein the oscillation detector detects an oscillation based on a detection signal of the position detector that detects a position of a moving member which moves following a disc change.

According to a disc changer of the present invention, an output of a sensor that detects a move of a member constituting a deck the changes a disc within the disc changer is monitored. An oscillation applied to the disc changer due to a variation in the output is detected. When the oscillation exceeds a predetermined value, and also when the disc changer is about to execute a disc change operation or a disc insertion or extraction operation, this operation is temporarily stopped. When the oscillation is lower than the predetermined value, the operation is restarted. Therefore, the disc changer can be protected at low cost.

BRIEF DESCRIPTION OF THE DRAWINGS

The present invention will be more clearly understood from the description as set forth below with reference to the accompanying drawings, wherein:

FIG. 4A to FIG. 4E are top plan views of the disc changer in operation;

FIG. 5A is a side view of the disc changer in a disc select operation;

FIG. 5B is a side view of the disc changer in a stocker divide operation;

FIG. 5C is a side view of the disc changer in a drive insert operation;

FIG. 5D is a side view of the disc changer in a disc mount operation;

FIG. 5E is a side view of the disc changer in a clamp operation;

FIG. 5F is a side view of the disc changer in a disc draw operation;

FIG. 5G is a side view of the disc changer in a stopper lift up operation;

FIG. 5H is a side view of the disc changer in a reproduce operation;

FIG. 5I is a side view of the disc changer in a disc accommodate operation;

FIG. 5J is a side view of the disc changer in a drive recede operation; and

FIG. 6 is a flowchart of one example operation of a protector of the disc changer according to the present invention.

DESCRIPTION OF THE PREFERRED EMBODIMENTS

Disc changers according to embodiments of the present invention are explained in detail below with reference to the accompanying drawings.

Figure 1:
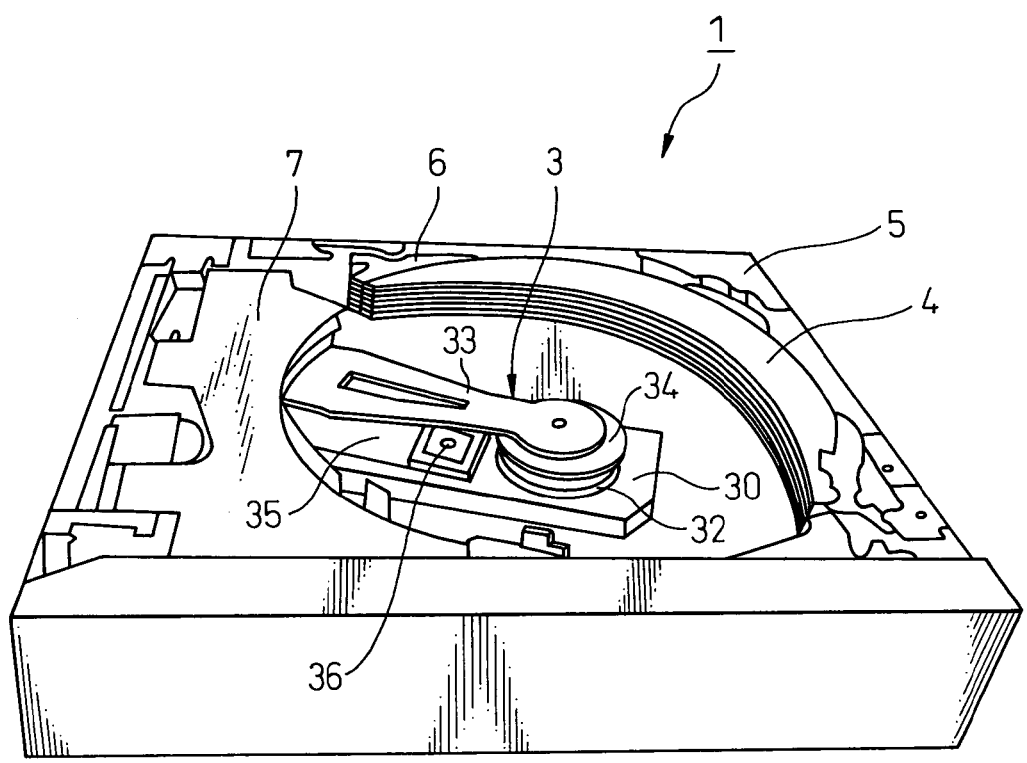
FIG. 1 is a perspective view of a configuration of a disc changer to which the present invention is applied.

FIG. 1 is a perspective view of a configuration of a disc changer 1 to which the present invention is applied, where a disc is not accommodated. The disc changer 1 to which the present invention is applied includes a stocker 4 as a disc accommodation rack capable of accommodating plural discs and capable of being lifted up and moved down within the disc changer, a swing arm 3 that takes out a disc from the stocker 4, reproduces content of the disc, and returns the disc to the stocker 4 after the reproduction, a drive unit 7 of the swing arm 3, a linear position sensor (not shown) that detects a position of the stocker 4, and a lifting mechanism 5 that lifts up and moves down the stocker 4 based on an output of the linear position sensor.

The swing arm 3 is rotated by the drive unit 7, and broadly includes a frame 30 and a clamp arm 33. A turntable 32 on which a disc is rotated is provided at the front end of the frame 30. An optical head 36 and a moving path 35 on which the optical head 36 moves are provided at the center of the frame 30. A base of the clamp arm 33 is fitted to the upper part of the frame 30 with a rotating axis. A clamper 34 that clamps a disc is rotatably provided at the front end of the clamp arm 33. The front end of the clamp arm 33 rotates to the frame 30 side, and sandwiches and fixes a disc mounted onto the turntable 32 with the clamper 34.

A position of the swing arm 3 in a vertical direction within the disc changer 1 is unchanged, and is constant. Therefore, in order to enable the swing arm 3 to clamp a desired one of the discs accommodated in the stocker 4, the stocker 4 is divided in a vertical direction and moves within the disc changer 1. The stocker 4 has one stocker base, and plural movable stockers as movable racks mounted on the stocker base. Each movable stocker can accommodate one disc. The stocker 4 moves up and down within the disc changer 1 based on the operation of the stocker lifting mechanism 5. In order to enable the swing arm 3 to take out a desired one of discs held in the stocker 4, the movable stockers constituting the stocker 4 can be divided into up and down portions at a desired position by a stocker dividing mechanism 6.

Figure 2:
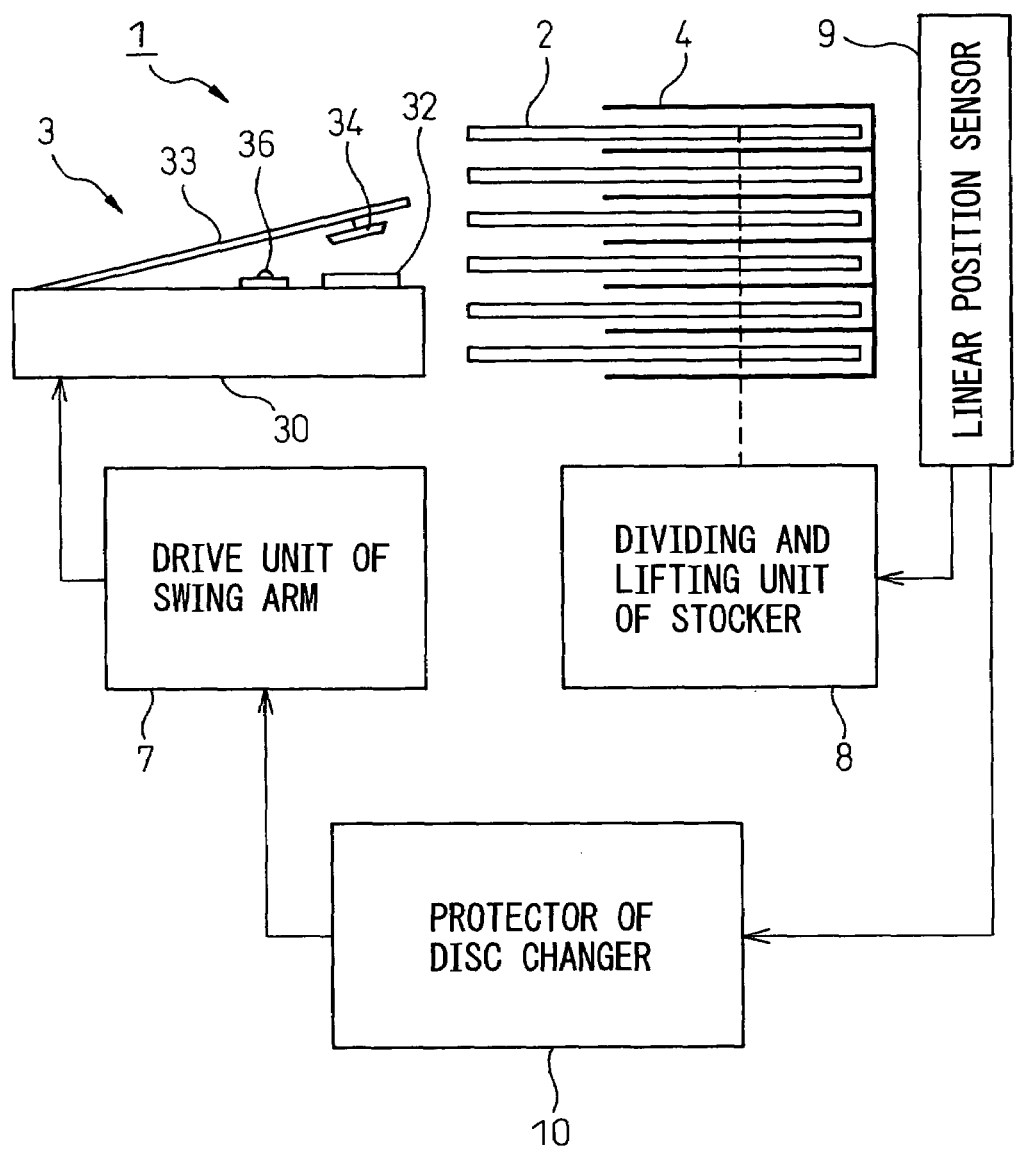
FIG. 2 is a block circuit diagram of a configuration of a disc changer having a protector of the disc changer according to the present invention.

FIG. 2 is a block circuit diagram of a configuration of the disc changer 1 having a protector 10 of the disc changer according to one embodiment of the present invention. FIG. 2 shows, as a block diagram, the internal configuration of the disc changer 1 shown in FIG. 1. In FIG. 2, constituent members that are the same as those of the disc changer 1 explained with reference to FIG. 1 are assigned like reference numerals.

The swing arm 3 has the frame 30 and the clamp arm 33 as shown in FIG. 1. The turntable 32 on which a disc is rotated is provided at the front end of the frame 30. The clamper 34 that is engaged with the turntable 32 is provided at the front end of the clamp arm 33. A reference numeral 36 denotes an optical head that reads data from a disc fitted to the turntable 32. The drive unit 7 of the swing arm 3 rotates the swing arm 3, enables the clamp arm 33 to clamp a disc, and moves the optical head 36.

In the present embodiment, six movable stockers are present in the stocker 4, and each movable stocker can accommodate one disc 2. In the present embodiment, the linear position sensor 9 can detect a position of the stocker 4. A stocker dividing and lifting mechanism 8 drives the stocker lifting mechanism 5 and the stocker dividing mechanism 6 shown in FIG. 1, thereby dividing and lifting the stocker 4.

According to the present invention, the disc changer 1 of the above configuration includes the disc changer protector 10 that detects an output value of the linear position sensor 9. The protector 10 always monitors an output voltage of the linear position sensor 9, and can detect a size of an oscillation applied to the disc changer 1 due to a change in the output voltage. When a microcomputer is incorporated in the protector 10 of the disc changer, the protector 10 can detect a size of the output voltage of the linear position sensor 9, as a digital value, by analog to digital (AD) converting the output voltage. When a size of the oscillation applied to the disc changer 1 exceeds a reference value, the protector 10 temporarily stops or cancels the swing arm drive unit 7 operating the swing arm 3. When a size of the oscillation applied to the disc changer 1 exceeds a reference value, the protector 10 of the disc changer can stop the stocker dividing and lifting mechanism 8 dividing the stocker 4.

Figure 3A:
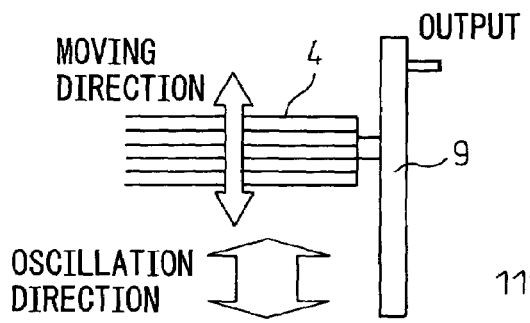
FIG. 3A is an explanatory diagram of a configuration of a linear position sensor that is used in the present invention.
Figure 3B:
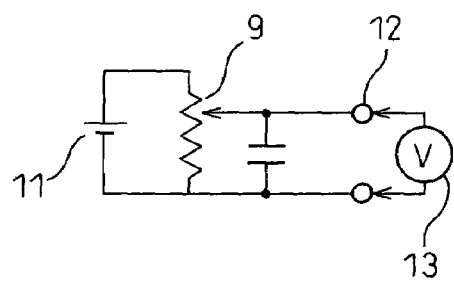
FIG. 3B is a circuit diagram of a configuration of the linear position sensor that is used in the present invention.

FIG. 3A is an explanatory diagram of a configuration of the linear position sensor 9 shown in FIG. 2. The linear position sensor 9 is provided as a sliding resistor on a path on which the stocker 4 moves. In other words, when the stocker 4 moves in the up and down directions of the disc changer, a resistance of the linear position sensor 9 changes, this change in the resistance is output. FIG. 3B is a circuit diagram of the electrical configuration of the linear position sensor 9. A voltage of a direct current power source 11 is applied across the linear position sensor 9. When the stocker 4 moves, the resistance of the linear position sensor 9 changes, and a voltage appearing at an output terminal 12 changes. The application voltage of the direct current power source 11 can be about 5 V.

Figure 3C:
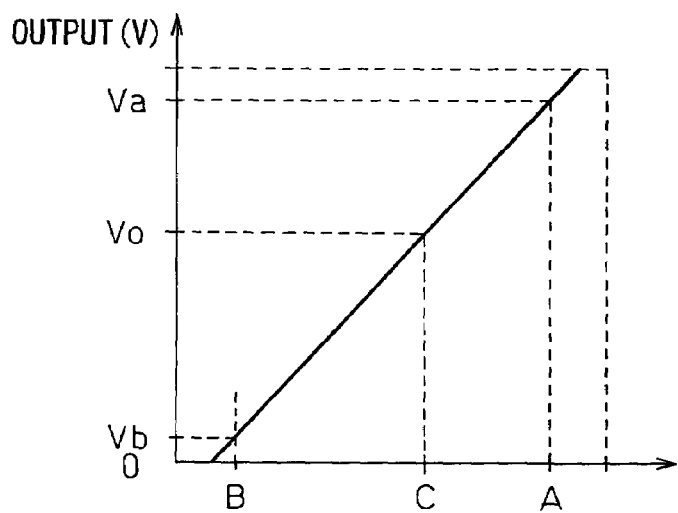
FIG. 3C is a characteristic diagram of an output of the linear position sensor that is used in the present invention.

FIG. 3C is a characteristic diagram of an output of the linear position sensor 9. The output (V) of the linear position sensor 9 linearly changes according to a height (i.e., a position) of the stocker 4 from the bottom surface of the disc changer. In the present embodiment, the stocker 4 is used within a range of a position B to a position A with satisfactory linearity. At the position B, 3.5% of a maximum output (100%) is obtained. At the position A, 96.5% of the maximum output is obtained. Therefore, when the stocker 4 is located at a position C as the origin of this diagram, it is clear from this characteristic diagram that the voltage output from the linear position sensor 9 becomes a voltage Vo.

Figure 3D:
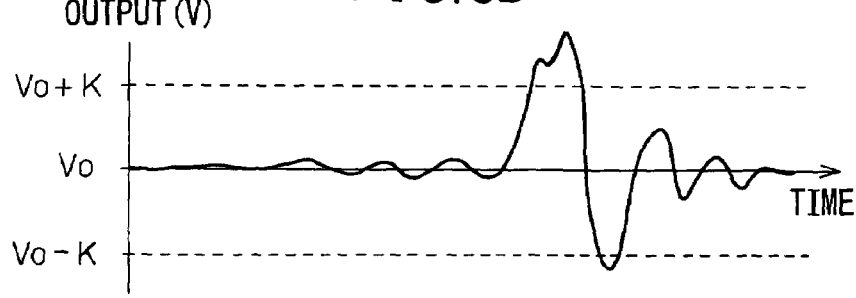
FIG. 3D is a line diagram of a change in the output of the linear position sensor when an external oscillation is applied to the disc changer.

An external oscillation is applied to the disc changer 1 in the same direction as the moving direction of the stocker 4, as shown in FIG. 3A. Therefore, when the external oscillation is applied to the disc changer 1, the stocker 4 moves. Consequently, the output voltage of the linear position sensor 9 changes due to the move of the stocker 4. In this case, as shown in FIG. 3B, a voltmeter 13 connected to the output terminal 12 of the linear position sensor 9 can detect a variation in the output voltage. FIG. 3D is a line diagram of a change in the output of the linear position sensor 9 when an external oscillation is applied to the disc changer 1.

According to the present embodiment, a reference value is provided in a variation of an output voltage Vo when the stocker 4 is at the predetermined position C. When the output voltage Vo exceeds the reference value, it is decided that a large oscillation is applied to the disc changer 1. This reference value is the output voltage Vo±K (V) of the linear position sensor 9 as shown in FIG. 3D. When it is decided that a large oscillation is applied to the disc changer 1, the protector 10 of the disc changer explained with reference to FIG. 2 temporarily stops or discontinues the operation of the driving unit 7 of the swing arm depending on the operating state.

Before explaining the operation of the protector 10 of the disc changer, a normal operation of the swing arm driving unit 7 and the stocker dividing and lifting mechanism 8 in the disc changer 1 to which the present invention is applied is explained. In other words, the operation where the swing arm 3 takes out one disc from the stocker 4, reproduces the content of the disc, and returns the disc to the stocker 4 after the reproduction is explained with reference to FIG. 4A to FIG. 4E and FIG. 5A to FIG. 5J. FIG. 4A to FIG. 4E are top plan views of the disc changer in operation, and FIG. 5A to FIG. 5J are side views of the disc changer in operation.

First, positions of the disc 2, the swing arm 3, and the stocker 4 in the disc changer 1 are explained with reference to FIG. 4A to FIG. 4E. FIG. 4A shows a waiting state of the disc changer 1 when the disc changer is not operating, or a state that the power supply to the disc changer 1 is disconnected. In this state, plural discs 2 are accommodated in the stocker 4. The swing arm 3 is accommodated in the swing arm driving unit 7, and is not shown in FIG. 4A. In this case, the discs within the stocker 4 can be freely lifted up and moved down with the stocker lifting mechanism 5 in the disc changer 1.

The operation of taking out the top disc 2 from among the discs accommodated in the stocker 4, and returning the disc to the stocker 4 after reproducing the content of the disc is explained with reference to FIG. 4B to FIG. 4E. In order to reproduce the content of the top disc 2 out of the discs 2 accommodated in the stocker 4, the stocker lifting mechanism 5 moves down the stocker 4 in the state shown in FIG. 4A. The top disc 2 is brought to a position at which this disc 2 is taken out with the swing arm 3. While the details are described later, the movable stockers in the stocker 4 are divided into upper and lower parts in this state. Only the movable stocker that accommodates the disc 2 of which content is to be reproduced is left, and other movable stockers in the stocker 4 fall further.

When the fall of the other movable stockers in the stocker 4 and the isolation of the movable stocker accommodating the reproduction disc 2 are completed, the swing arm driving unit 7 drives the swing arm to rotate the swing arm toward a center hole of the disc 2 within the disc changer, as shown in FIG. 4B. In FIG. 4B, only the clamp arm 33 located above the swing arm 3, and the clamper 34 are shown. Because the frame of the swing arm 3 is located below the disc 2, the frame is not shown in FIG. 4B. The not shown frame moves between the reproduction disc 2 and other discs 2 that are divided and located below this reproduction disc 2.

As shown in FIG. 4C, the swing arm 3 stops the rotation above the center holed of the disc 2. In this state, only the movable stocker that accommodates the reproduction disc 2 falls, and disc held in this stocker is mounted on the turntable of the swing arm 3. When the reproduction disc 2 is mounted on the turntable, the clamp arm 33 of the swing arm 3 rotates to the turntable, and the clamper 34 clamps the reproduction disc 2 and fixes it onto the turntable.

When the clamper 34 fixes the reproduction disc 2 onto the turntable, the swing arm 3 rotates to a reproduction position of the disc 2, and reproduces the content of the disc 2, as shown in FIG. 4D. When the reproduction of the content of the disc 2 ends, the swing arm 3 rotates again toward the center hole of the disc 2 held in the movable stocker, and accommodates the disc 2 of which content has been reproduced into the stocker 4, as shown in FIG. 4E. FIG. 4E shows a state that a part of the disc 2 of which content has been reproduced is inserted into the stocker 4, and not a state that the disc 2 is completely returned to the stocker 4.

When the disc 2 of which content has been reproduced is completely accommodated in the stocker 4, the state as shown in FIG. 4C is obtained. Thereafter, the swing arm 3 rotates and returns to the driving unit 7 of the swing arm 3, and reaches the state as shown in FIG. 4A. In this state, the stocker 4 moves in an up or down direction to bring the next disc 2, of which the content is to be reproduced, to a position of the swing arm 3, and repeats the same reproduction of this disc 2. The disc 2 accommodated in the stocker 4 can be changed with other disc located at the outside of the disc changer, but the change of the disc 2 is not explained here.

The above operation of taking out the disc 2 from the stocker 4, reproducing the content of the disc 2, and returning the disc 2 to the stocker 4 as observed from the side surface of the disc changer 1 is explained in further detail with reference to FIG. 5A to FIG. 5J. In order to make clear the dividing operation of the stocker 4, a state of reproducing the content of a disc 2-3 located at a third position from the top of the discs 2 stored in the stocker 4 is explained. As shown in FIG. 5A, six movable stockers 4-1 to 4-6 are mounted on a stocker base 4-B of the stocker 4. Each of the movable stockers 4-1 to 4-6 can be moved independently. Each of the movable stockers 4-1 to 4-6 can accommodate one disc 2. The six discs 2 are identified as a disc 2-1 to a disc 2-6 from the top, as shown in FIG. 5B.

FIG. 5A shows the same state as that of FIG. 4A, and shows a state before the disc 2 is reproduced. FIG. 5A shows only the turntable 32 and the clamper 34 of the swing arm 3, and omits the other constituent members of the swing arm 3. In the state as shown in FIG. 5A, the turntable 32 and the clamper 34 are sheltered from the moving range of the discs 2. The discs 2 in the stocker 4 can be moved to up and down portions of the disc changer 1. In other words, FIG. 5A shows a state before selecting a disc of which content is to be reproduced.

FIG. 5B shows a state that a disc 2 of which content is to be reproduced is selected, with the stocker 4 divided into parts. Specifically, in FIG. 5B, the disc 302 in the third movable stocker 403 from the top is selected, and the stocker 4 is divided into three parts. In this state, a space into which the turntable 32 can be inserted is formed below the selected disc 2-3, and a space into which the clamper 34 can be inserted is formed above the disc 2-3. The state shown in FIG. 5B is the same as the state shown in FIG. 4A. The dividing mechanism of the stocker 4 is not explained here.

FIG. 5C shows a state where the turntable 32 and the clamper 34 that constitute a disc drive are inserted into the upper space and the lower space respectively formed in the state shown in FIG. 5B. FIG. 5C corresponds to the state shown in FIG. 4B and FIG. 4C. The insertion of the turntable 32 and the clamper 34 ends at the position of the center hole of the disc 2-3. Thereafter, as shown in FIG. 5D, the third movable stocker 4-3 from the top falls, and the disc 2-3 held in the movable stocker 4-3 is mounted on the turntable 32.

When the disc 2-3 is mounted on the turntable 32, the clamper 34 clamps the disc 2-3 as shown in FIG. 5E. Then, as shown in FIG. 5F, the disc 2-3 is extracted from the stocker 4-3 based on the move of the turntable 32. Because the stocker 4-3 is a crescent as shown in FIG. 1 and FIG. 4A to FIG. 4E, when the turntable 32 moves to the reproduction position to some extent, the turntable 32 is not engaged with the disc 2-3. In this state, the stocker 4-3 having no disc moves up as shown in FIG. 5G.

Thereafter, the turntable 32 further continues to rotate to a direction of extracting the disc 2-3, and stops at the reproduction position as shown in FIG. 5H. This state corresponds to the state shown in FIG. 4D, and the content of the disc 2-3 is reproduced at this position. After the reproduction of the content, the turntable 32 moves to the stocker 4, and accommodates the disc 2-3 in the original movable stocker 4-3, as shown in FIG. 5I. The state of FIG. 5I corresponds to the state shown in FIG. 4E. At this time, the movable stocker 4-3 is already down at the position of accommodating the disc 2-3.

When the disc 2-3 is accommodated in the movable stocker 4-3, the clamper 34 rises, and the disc 2-3 becomes free on the turntable 32. Therefore, the turntable 32 and the clamper 34 constituting the disc drive go back to a position where the turntable 32 and the clamper 34 do not interfere with the disc held on the stocker 4, thereby ending the reproduction of the content of the disc 2-3, as shown in FIG. 5J. Thereafter, the movable stocker 4-3 rises to the position as shown in FIG. 5C. When a reproduction of the content of the disc 2 is to be further continued, the dividing position of the stocker 4 shown in FIG. 5B changes, and the operation similar to that shown in FIG. 5B to FIG. 5J is repeated.

In the operation of reproducing the content of a disc explained above, when an external large oscillation is applied to the disc changer 1, this operation can be continued without any problem, or the operation should be temporarily stopped, or the operation should be canceled to recover a state before the start of the operation, depending on the situation. The operation in the state that there is no problem when a large oscillation is applied is called an operation A. The operation in the state that the operation should be temporarily stopped when a large oscillation is applied is called an operation B. The operation in the state that the operation should be canceled to recover a state before the start of the operation is called an operation C. The operation C is in the most serious state in that the oscillation may cause a collision of the disc against the stocker.

The operation A during the reproduction of the content of a disc includes the following cases.

(A1) After a dividing position of the stocker is determined, the stocker is divided (FIG. 5B)

(A2) The swing arm clamps the disc, and takes out the disc (FIG. 5G and FIG. 5H)

(A3) The content of the disc is being reproduced on the turntable of the swing arm (FIG. 5H)

(A4) After the disc is returned to the stocker, the swing arm returns (FIG. 5J)

The operation B during the reproduction of the content of a disc includes the following cases.

(B1) The disc is immediately before being mounted on the turntable (FIG. 5D)

(B2) The disc is clamped to the turntable (FIG. 5E)

(B3) The swing arm is immediately before starting the operation (FIG. 5B)

The operation C during the reproduction of the content of a disc includes the following cases.

(C1) The swing arm sandwiches the disc (FIG. 5C)

(C2) The swing arm returns the disc to the stocker (FIG. 5I)

In the above operations A to C, a control procedure of the protector 10 of the disc changer according to the present invention shown in FIG. 2 is explained with reference to a flowchart shown in FIG. 6. The execution cycle of the control procedure shown in this flowchart is 10 ms, for example.

At step 601, the output value Vo of the linear position sensor corresponding to a value of the current stopper position indicated by the stocker dividing and lifting mechanism, is calculated. The output value Vo of the linear position sensor can be calculated based on the characteristic diagram explained with reference to FIG. 3C. At step 602, an actual output voltage Vr of the linear position sensor 9 is detected. At step 603, a variation in the actual output voltage Vr of the linear position sensor 9 is detected. When the variation exceeds ±K (V), the process proceeds to step 604, and the operation of the swing arm is detected.

At step 605, it is decided whether the operation of the swing arm is the operation A. When the operation of the swing arm is the operation A, this routine ends. On the other hand, when the operation of the swing arm is not the operation A, the process proceeds to step 606, and it is decided whether operation of the swing arm is the operation B. When a decision made at step 606 is YES, the operation of the swing arm is the operation B. Therefore, the process proceeds to step 607, and the operation B is temporarily stopped, thereby ending this routine. When a decision made at step 606 is NO, the operation of the swing arm is the operation C. Therefore, the process proceeds to step 608, and the operation returns to a state before the swing arm carries out the operation C, thereby ending the routine.

On the other hand, when a decision made at step 603 is No and also when there is no application of a large oscillation, the process proceeds to step 609, and it is decided whether the last operation of the swing arm is the operation C. When the last operation of the swing arm is the operation C (YES), the process proceeds to step 610, and the swing arm is made to carry out the operation C from the beginning, thereby ending this routine. When a decision made at step 609 is NO, the process proceeds to step 611, and it is decided whether the last operation of the swing arm is the operation B. When the last operation of the swing arm is the operation B (YES), the process proceeds to step 612, and the swing arm is made to restart the temporarily-stopped operation B, thereby ending this routine. When a decision made at step 611 is NO, the last operation of the swing arm is the operation A, and the routine ends.

As explained above, according to the above embodiment, a large oscillation added to the disc changer is detected based on a variation in the output voltage of the linear position sensor 9 that is not a normal oscillation sensor. When it is decided that a large oscillation is applied, the swing arm is controlled to continue the operation, or temporarily stop the operation, or cancel the operation to return to the original state, depending on the operation state of the swing arm. Because the application of a large oscillation to the disc changer is temporary, the temporary stop of the operation B is canceled, and the operation C is restarted, when this large oscillation stops.

In the above embodiment, the output of the linear position sensor that detects a position of the stocker of discs of the disc changer is used as means for detecting a large oscillation applied to the disc changer. However, means for detecting a large oscillation applied to the disc changer is not limited to this. When other means for detecting an upper or lower position of the mechanical part is available, this means can be used.

In the above embodiment, a protector that ensures a safe operation of the swing arm to reproduce the content of a disc when a large oscillation is applied to the disc changer is explained. The present invention can also be applied to the mechanism of dividing the stocker into three parts as shown in FIG. 5B. The stocker dividing mechanism divides the stocker by inserting a wedge type dividing lever into between the variable stockers 4-1 to 4-6 shown in FIG. 5A. When an oscillation is applied, there is a risk that this dividing lever cannot be correctly inserted into between the dividing stockers. In this case, the divide operation of the dividing lever to divide the stocker can be stopped until the oscillation stops.

What is claimed is:

1. A disc changer that changes a plurality of discs to reproduce content of a disc, the disc changer comprising:

a disc accommodation rack that accommodates a plurality of discs and that is lifted up and moved down within the disc changer;

a swing arm that takes out a disc from the disc accommodation rack, and reproduces content recorded on the disc;

a drive unit of the swing arm;

a position sensor that detects a position of the disc accommodation rack which rises and falls within the disc changer, outputs a predetermined voltage according to the position thereof, and outputs a change of voltage due to the movement of the disc accommodation rack as a result of detection of an oscillation applied to the disc changer;

a lifting mechanism that lifts up and moves down the disc accommodation rack;

a swing arm operation state detector which detects an operation state of the swing arm; and a temporary stopper that temporarily stops the move operation of the swing arm, when the swing arm operation state detector detects a predetermined state of the swing arm and the oscillation is detected by the position sensor.

2. The disc changer according to claim 1, the disc changer further comprising a restarter that cancels the temporary stop operation of the swing arm carried out by the temporary stopper when the oscillation detected by the oscillation detector becomes lower than a predetermined value.

3. The disc changer according to claim 1, wherein the position sensor is a linear position sensor that detects a position of the disc accommodation rack, and the lifting mechanism lifts up and moves down the disc accommodation rack based on the output of the linear position sensor.

4. The disc changer according to claim 1, further comprising:

a stopper that stops the move operation of the swing arm and returns the swing arm to a position before the move when the swing arm operation state detector detects another predetermined operation state of the swing arm due to the application of an oscillation; and a swing arm operation redoing unit that redoes the swing arm operation from the beginning when the oscillation detected by the oscillation detector becomes lower than a predetermined value.

5. The disc changer according to claim 3, further comprising:

a stopper that stops the move operation of the swing arm and returns the swing arm to a position before the move when the swing arm operation state detector detects another predetermined operation state of the swing arm due to the application of an oscillation; and a swing arm operation redoing unit that redoes the swing arm operation from the beginning when the oscillation detected by the oscillation detector becomes lower than a predetermined value.

6. The disc changer according to claim 1, wherein the predetermined operation state of the swing arm is any one of an operation state immediately before a disc is mounted on the turntable, an operation state when a disc is clamped to the turntable, and a state immediately before the swing arm starts operation.

7. The disc changer according to claim 3, wherein the predetermined operation state of the swing arm is any one of an operation state immediately before a disc is mounted on the turntable, an operation state when a disc is clamped to the turntable, and a state immediately before the swing arm starts operation.

8. The disc changer according to claim 4, wherein the predetermined operation state of the swing arm is any one of an operation state immediately before a disc is mounted on the turntable, an operation state when a disc is clamped to the turntable, and a state immediately before the swing arm starts operation.

9. The disc changer according to claim 1, wherein the predetermined operation state of the swing arm is either one of a state that the swing arm is inserted into an upper space and a lower space of a disc to sandwich the disc and a state that the swing arm returns a disc to a stocker.

10. The disc changer according to claim 3, wherein the predetermined operation state of the swing arm is either one of a state that the swing arm is inserted into an upper space and a lower space of a disc to sandwich the disc and a state that the swing arm returns a disc to a stocker.

11. The disc changer according to claim 4, wherein the predetermined operation state of the swing arm is either one of a state that the swing arm is inserted into an upper space and a lower space of a disc to sandwich the disc and a state that the swing arm returns a disc to a stocker.

12. The disc changer according to claim 1, wherein the position sensor is a preset resistor.

13. The disc changer according to claim 3, wherein the position sensor is a preset resistor.

14. The disc changer according to claim 4, wherein the position sensor is a preset resistor.

15. The disc changer according to claim 5, wherein the position sensor is a preset resistor.

16. The disc changer according to claim 6, wherein the position sensor is a preset resistor.

17. A disc changer having an oscillation restricting operation function for restricting a predetermined operation based on a result of detecting an oscillation by a position sensor, wherein
the position sensor detects an oscillation based on a detection signal of the position sensor that detects a position of a disc accommodation rack which moves following a disc change, and outputs a change of voltage due to the movement of the disc accommodation rack as a result of the detection of the oscillation applied to the disc changer by the position sensor.

18. The disc changer according to claim 17, further comprising:
a stopper that stops a move operation of a swing arm that takes out a disc from the disc accommodation rack, and returns the swing arm to a position before the move when a swing arm operation state detector detects another predetermined operation state of the swing arm due to the application of an oscillation; and
a swing arm operation redoing unit that redoes the swing arm operation from the beginning when the oscillation detected by the position sensor becomes lower than a predetermined value.

19. The disc changer according to claim 18, wherein the predetermined operation state of the swing arm is any one of an operation state immediately before a disc is mounted on the turntable, an operation state when a disc is clamped to the turntable, and a state immediately before the swing arm starts operation.

20. The disc changer according to claim 17, wherein the position sensor is a preset resistor.

* * * * *